UNITED STATES PATENT OFFICE.

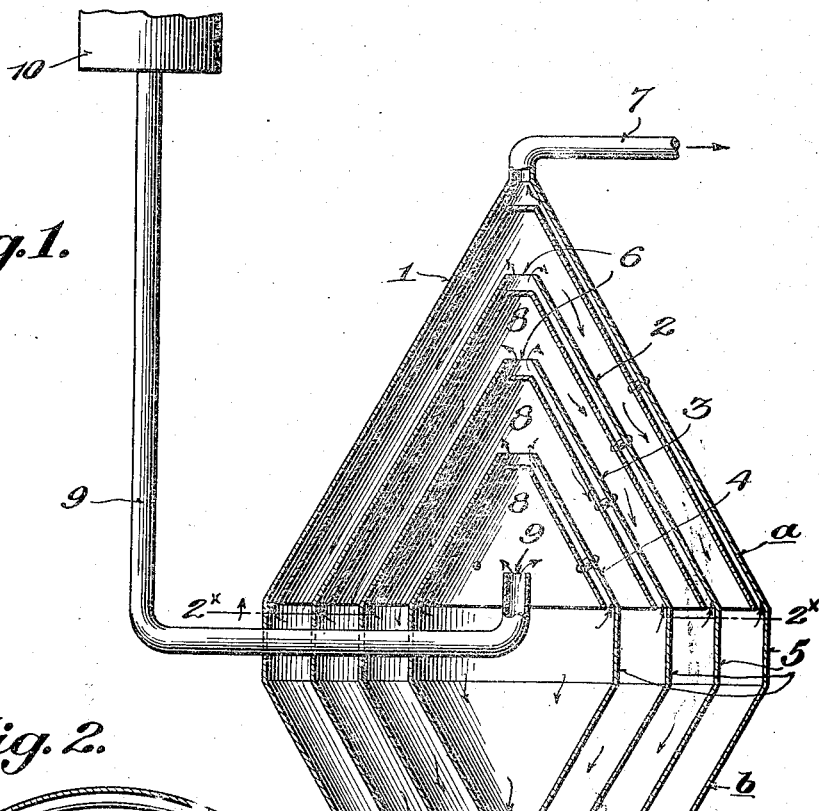
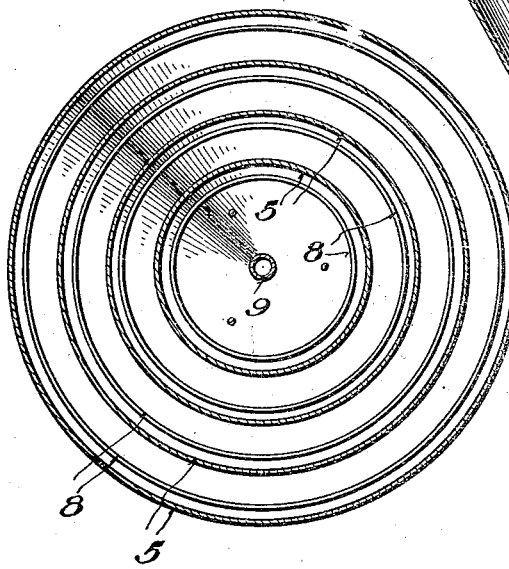

ODIN A. SUNDNESS AND ROY M. BAKER, OF CHISHOLM, MINNESOTA.

DEWATERER AND CLASSIFIER.

1,274,814.

Specification of Letters Patent.

Patented Aug. 6, 1918.

Application filed March 16, 1918. Serial No. 222,925.

*To all whom it may concern:*

Be it known that we, ODIN A. SUNDNESS and ROY M. BAKER, citizens of the United States, residing at Chisholm, in the county of St. Louis and State of Minnesota, have invented certain new and useful Improvements in Dewaterers and Classifiers, of which the following is a specification.

This invention relates to an improvement in dewaterers and classifiers, and an object of the invention is to provide a series of receptacles so related that the liquid introduced into the initial or first receptacle will cause a separation of the heavy particles from the liquid and allow the liquid and lighter particles to pass therefrom into the next receptacle where a further separation will take place and so on until the liquid has passed through all of the receptacles.

The invention consists of a plurality of hollow cone-shaped members interfitted with a sufficient space therebetween to allow liquid to circulate therebetween, and connected to the bases of each of said cone members is an inverted cone member. Each of the cone members has an opening at the apex thereof and received in each of the cone members is a hollow frustum cone-shaped member or baffle. By this arrangement of the cone members liquid containing solids from an ore dressing plant may be introduced into the innermost cone-member under a suitable pressure, the liquid and the solids will be directed upwardly in the cone member against the baffle therein which will cause the liquid and the solids to travel downward into the inverted-cone member connected to said cone-member, the heavy particles or solids falling into the inverted cone member and the liquid and lighter particles passing through the opening at the top of the cone-member into the next cone member. The liquid and lighter particles entering the next cone-member will be received within the baffle and be deflected downwardly causing a further separation of the particles from the liquid. This process is continued throughout the series of cone-members. It is to be noted that the velocity of the liquid will be decreased on the area throughout which it flows, and as it flows from one cone-member to another the velocity is constantly decreasing, so that the particles carried in suspension will be gradually separated depending upon the specific gravity of the material in suspension. The inverted cone-members will therefore, each receive a grade of material due to the specific gravity of the particles carried by the liquid.

The invention consists of certain novel features of construction and combinations of parts which will be hereinafter described and pointed out in the claims.

In the accompanying drawings:—

Figure 1 is a vertical sectional view of the invention; and

Fig. 2 is a horizontal sectional view on line $x$—$x$ of Fig. 1.

In the drawings, 1, 2, 3, and 4, represent a plurality of receptacles of varying sizes, the receptacles being received one within the other, and the receptacle 4 being the smallest and innermost receptacle. Each receptacle consists of a cone-member $a$, and an inverted cone-member $b$, the two cone members of each receptacle being connected together at their inner ends by an annular band 5.

The cone-members $a$, are each provided at their apexes with an outlet opening 6. The outermost receptacle 1 has a pipe 7 connected to the apex thereof and in communication with the outlet opening 6 for the purpose of conducting the clarified water or liquid to a suitable source or receptacle.

Received and suitably supported within the cone-members $a$ of each receptacle are hollow frustum cone baffles 8. The baffles are so arranged within the cone-members that a suitable passage is formed between the outer surface of a baffle and the inner surface of a cone member, so that the liquid or water and the particles carried thereby may pass freely and be discharged through the outlet opening 6 into the next receptacle.

A feed pipe 9 leading from a tank or other receptacle 10 extends through the bands 5 of the receptacles into the receptacle 4 and discharges the liquid with its solids to be classified or purified. To the bottom of each inverted cone member $b$, of the several receptacles is connected a pipe 11 for the discharge of the contents of the receptacles. A suitable cut-off valve 12 is provided for each pipe, which is normally closed, but which may be opened to permit the discharge.

From the foregoing description of the various parts of the device the operation thereof may be readily understood.

The cocks 12 are closed and the contents of the tank 10 are permitted to pass through the pipe line into the interior of the inner receptacle.

The liquid and solids entering the receptacle 4 are caused to come in contact with the baffle 8 in said receptacle and are deflected downwardly. The current passes underneath the baffle and thence upwardly between the baffle and the adjacent cone 4 passing out into the next receptacle through the opening 6. Here it is again deflected downwardly, passing underneath the next baffle 8 and thence upwardly between the baffle and its associated cone. It will be observed that the downward movement causes the stream to enter a portion of the still water at the bottom of the baffles. Furthermore, each downward passage is successively slower because of the fact that the area at the base of each successive baffle is progressively greater. After the current has passed around the bottom of the last baffle, it flows upwardly between the baffle and the outer cone and thence out through the pipe 7. The action of the current results in a deposit of the matter suspended thereby in successive portions. Since the current is greater in the inner receptacle, the larger particles will be deposited therein, and as the rate of the downward flow is decreased, the smaller particles are deposited so that in the outer receptacle those of the finest grade will be found.

It will be noted that there is a continuous stream which is brought successively into still water at different portions of its travel, the velocity of this stream being constantly lessened so as to enter the still water at different velocities and hence to deposit different grades or sizes of particles.

Not only is the downward flow of liquid progressively slower into the successive receptacles, but the outflow of liquid through the pipe 7 is substantially the same as the inflow through pipe 9. What we have succeeded in doing is in providing a device that is so shaped that during the passage of the liquid therethrough the rate of downward flow is changed so as to deposit the different grades or sizes of material, but the outflow is uniform, thus permitting the continuous operation of the device.

It is evident that many slight changes may be made in the arrangement and construction of the parts without departing from the spirit and scope of the invention set forth, and hence we do not wish to be limited to the exact details of construction herein disclosed.

What we claim as our invention and desire to secure by Letters Patent, is:—

1. In a dewaterer and classifier, the combination of a plurality of receptacles arranged one within the other, each receptacle having communication with the other, and means for delivering a liquid to one of the receptacles which will flow from one receptacle to the other and a separation of the particles therefrom taking place as the velocity of the stream decreases.

2. In a dewaterer and classifier, the combination of a plurality of receptacles arranged one within the other, each receptacle having communication with the other, means for conducting a liquid to one of the receptacles, and means in each receptacle for causing a separation of the particles from the liquid as it passes from one receptacle to another.

3. In a dewaterer and classifier, the combination of a plurality of receptacles, each consisting of two cone-shaped members connected together at their bases, said receptacles being of varying sizes and arranged one within the other, and having communication with each other, a cone-shaped baffle arranged in each receptacle for deflecting the water from the outlet opening of the receptacle, and means for conducting water to one of the receptacles.

4. In a dewaterer and classifier, the combination of a plurality of cone-shaped receptacles having an opening at their apexes, said receptacles being of varying sizes and arranged one within the other, a cone-shaped baffle located in each receptacle beneath the outlet opening and against which the water comes in contact in entering a receptacle, means for conducting water to one of the receptacles, and means for governing the discharge of the collected material of each receptacle.

5. In a dewaterer and classifier a plurality of receptacles, each of said receptacles containing a body of relatively still water and means for causing a slow downward flow of liquid into the still water of each receptacle and a relatively rapid flow of liquid from each receptacle into the adjacent receptacle.

6. In a dewaterer and classifier a plurality of receptacles, each of said receptacles containing a body of relatively still water and means for causing a slow downward flow of liquid into the still water of each receptacle and a relatively rapid flow of liquid from each receptacle into the adjacent receptacle, the downward flow of the liquid being progressively slower in the successive receptacles.

7. In a dewaterer and classifier a plurality of receptacles, each of said receptacles containing a body of relatively still water, means for causing a slow downward flow of liquid into the still water of each receptacle and a relatively rapid flow of liquid from each receptacle into the adjacent receptacle, the downward flow of the liquid being progressively slower in the successive receptacles, a discharge pipe, the rate of discharge through said discharge pipe being substantially that of the rate of flow into the first receptacle.

In testimony whereof we have affixed our signatures.

ODIN A. SUNDNESS.
ROY M. BAKER.

Copies of this patent may be obtained for five cents each, by addressing the "Commissioner of Patents, Washington, D. C."